Nov. 7, 1961  E. J. MULLIN  3,007,617
AUTOMOBILE COAT HANGER SUPPORT
Filed Aug. 1, 1958
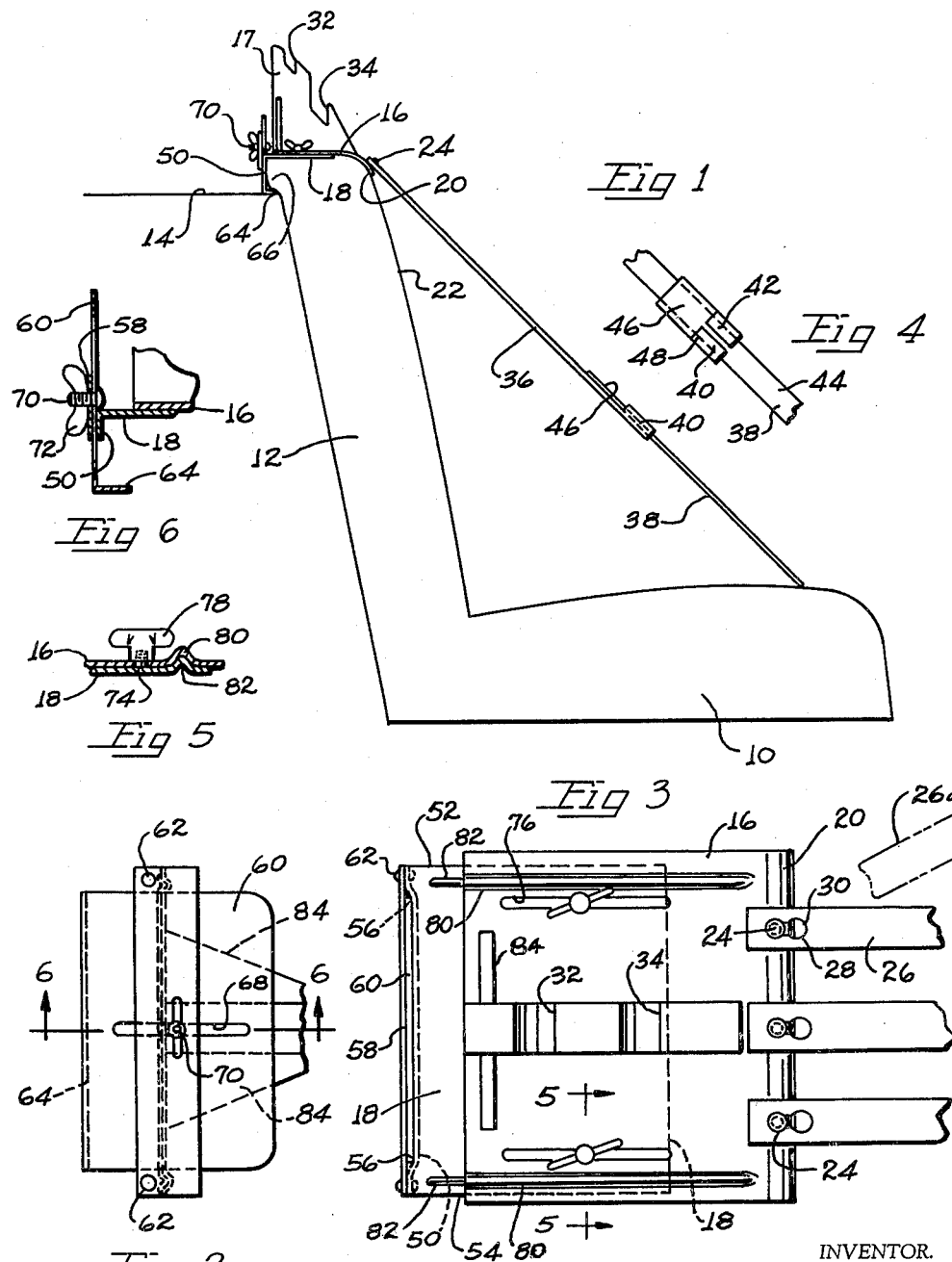
INVENTOR.
ERIC J. MULLIN
BY
SMITH, WILSON, LEWIS & McRAE

3,007,617
AUTOMOBILE COAT HANGER SUPPORT
Eric J. Mullin, 1150 Lake St., Tawas City, Mich.
Filed Aug. 1, 1958, Ser. No. 752,626
1 Claim. (Cl. 224—29)

This invention relates to a mechanism for supporting clothing in wrinkle-free condition within a vehicle interior.

One object of the invention is to provide a clothing support mechanism which can be positioned on the upper portion of a vehicle seat back so as to support clothing in a wrinkle-free condition extending downwardly and forwardly in the space normally occupied by the seat occupant.

Another object of the invention is to provide a clothing support mechanism of the above-identified character, wherein the mechanism is capable of adjustment in different directions so as to enable it to be mounted within all present day automotive vehicles, irrespective of variations in seat back contour, size or positionment.

Another object of the invention is to provide a clothing support mechanism of the above-identified character wherein the adjustments necessary to adapt the mechanism to different seat structures are easily and quickly effected by inexperienced persons.

Another object of the invention is to provide a clothing support mechanism of the above identified character, wherein the mechanism is of such design as to permit manufacture as a compact low cost item thereby permitting the device to be sold in volume in gasoline service stations and other sales outlets handling similar small low cost devices.

Another object of the invention is to provide a clothing support mechanism which is of compact character, and which includes a plurality of telescopically related support devices, said support devices being capable of easy removal from the remaining mechanism and storage in a small compact telescoped fashion.

Other objects of this invention will appear in the following description and appended claim, reference being had to the accompanying drawings forming a part of this specification wherein like reference characters designate corresponding parts in the several views.

In the drawings:

FIG. 1 is an elevational view showing the rear seat of an automotive vehicle with one embodiment of the invention supported thereon.

FIG. 2 is a left elevational view of the FIG. 1 embodiment rotated through ninety degrees.

FIG. 3 is a top plan view of the FIG. 1 embodiment.

FIG. 4 is a top plan view of a portion of the structure shown in FIG. 1.

FIG. 5 is a sectional view on line 5—5 in FIG. 3.

FIG. 6 is a sectional view on line 6—6 in FIG. 2.

Before explaining the present invention in detail, it is to be understood that the invention is not limited in its application to the details of construction and arrangement of parts illustrated in the accompanying drawings, since the invention is capable of other embodiments and of being practiced or carried out in various ways. Also, it is to be understood that the phraseology or terminology employed herein is for the purpose of description and not of limitation.

In the drawings there is shown a conventional automotive vehicle seat structure, including a seat portion 10 and a back portion 12. The space rearwardly of back structure 12 is closed by a conventional panel structure 14 which defines a package tray area on its upper surface adjacent the vehicle rear window (not shown).

Disposed on the upper edge portion of back structure 12 is a clothing support mechanism including a plate 16 and a subjacent plate 18. The forward portion of plate 16 is turned downwardly at 20, so as to closely engage against the front surface 22 of the seat back. A plurality of headed pins 24 project outwardly from plate portion 20 to serve as mounting portions for a plurality of strip structures 26. Each of the strip structures is provided with a keyhole slot 28 which has an enlarged portion 30 for passage over the head portion of pin 24 and a narrow portion for engagement with the shank portion of the pin to hold the strip structure onto plate 16 as shown in FIG. 3. The employment of headed pins 24 is such as to permit the strip structures to be pivoted around the pin axis for adjustment purposes as denoted by dotted line position 26a in FIG. 3. Thus, in use of the apparatus when it is desired to support clothing on hangers carried by hook portions 32 and 34 (see FIG. 1) the three strip structures 26 may be positioned as shown in full lines or they may be extended from plate 16 in a generally "fan-like" relation as depicted by dotted line position 26a. In the "fan-like" position the strip structures are adapted to present a comparatively wide support surface so as to permit support of ladies' dresses and other garments which should be supported without creasing or folding over in order to retain desired "wrinkle-free" characteristics.

In order to retain the three strip structures in substantial planar alignment with one another in their "fan-like" positions, and also to permit storage of the strip structures in small spaces, each of strip structures is constructed as a multi-piece element comprising a first strip element 36 and a second strip element 38. The lower end portion of strip element 36 is enlarged to form fingers 40 and 42. These fingers are turned over onto the upper face portion 44 of the strip element 38. The extreme upper end portion of strip 38 is enlarged as at 46, so as to form a shoulder 48 for engagement with the fingers 40 and 42 to prevent separation of the strip elements 36 and 38. However, strip element 38 may be slid upwardly on strip element 36 so as to permit compact storage of the strip elements after they have been removed from the pin structures 24. Additionally, adjustment of strip element 38 relative to strip element 36 may be utilized to maintain the planar alignment of the various strip structures when the strips are arranged in their "fan-like" positions. The arrangement is such that fingers 40 and 42 may exert a tight clamping pressure on the upper surface 44 of strip element 38 so as to maintain said strip element in any desired position of adjustment.

It will be noted that when the mechanism is in its installed position with conventional wire coat hangers suspended from hooks 32 and 34 the clothes on one of the hangers will not interfere with clothes on the other coat hanger. Thus, it will be seen from FIG. 1 that the hook-forming surfaces of hooks 32 and 34 are on opposite sides of an imaginary plane extending parallel to the general plane defined by strips 26. As a result, one clothes-loaded hanger can be supported in hook structure 34 and another clothes-loaded hanger can be supported in hook structure 32 without one set of clothing interfering with or mussing up the other set of clothing.

In the devices of the instant character it is necessary that the clothing support mechanism have a firm immovable engagement with the vehicle seat back structure so as not to be jarred loose during vehicle movement. Accordingly, under the present invention plate 18 is provided with a downwardly extending flange 50. Flange 50 extends laterally for the entire distance between the edges 52 and 54 of plate 18. However, the central portions of flange 50 are bulged forwardly as by bending at points 56 so as to cooperate with a strap member 58 in forming a slide structure for a third plate element 60. Strap 56 is fixedly secured to flange 50, as for example by means of rivets 62. Plate 60 is provided at its lower end with a forwardly turned flange portion 64 which is intended to seat in the small recess formed at the juncture between conventional shelf member 14 and the projecting portion 66 of the conventional seat back structure 12.

It will be noted that plate 60 is provided with a vertically elongated slot 68. As can be seen from FIGS. 1 and 6, strap 58 projects above the general plane of plate 18. The portion of strap 58 above plate 18 is provided with a small circular opening which receives the shank portion of a headed screw 70. A wing nut 72 is threaded onto screw 70 to cooperate therewith in clamping plate 60 in vertically adjusted positions relative to plate 18.

Plates 16 and 18 are held in positions of horizontal adjustment relative to one another by means of studs 74 projecting from plate 18 thru slots 76 in plate 16 and into meshing engagement with thumb nuts 78. Manual adjustment of the plates 16 and 18 relative to one another is effected by loosening nuts 78, sliding plates 16 and 18 until the desired position is attained, and tightening nuts 78 down into clamping engagement against the upper surface of plate 16. To maintain the plates 16 and 18 in their desired slidable relation without jamming during the adjustment operation, each of the plates is provided with an upwardly embossed rib 80 or 82. These ribs serve to prevent one plate from taking an undesired angular movement with respect to its adjacent plate, and thereby promote a smooth sliding action during the adjusting operation.

It is desirable that the device be of rigid construction. There is therefore provided a pair of reinforcing ribs 84. In operation of the mechanism the device is initially installed with its inturned flange portion 64 seated firmly in the recess formed between shelf 14 and seat back portion 66; screw 72 is in a loosened condition. The assembly of plates 16, 18 and upwardly extending hook structure 17 is then adjusted downwardly until plate 18 seats firmly against the upper edge surface of seat back structure 12. Wing nut 72 is then tightened to hold the assembly in its vertically adjusted position.

Plate 16 is then slid rearwardly on plate 18 until its front flange portion 20 seats firmly against the surface 22 of the back structure 12. Wing nuts 78 are then tightened to hold the assembly in its desired position of adjustment. In use of the apparatus strip structures 26 are extended downwardly from the plates 16 as shown in FIGS. 1 and 3 so as to support clothing in a downwardly, forwardly declined position.

I claim:

Clothes retention mechanism, including an adustable mounting structure comprised of relatively movable and lockable clamping components capable of being adjusted to exert clamping pressure on the upper edge of a conventional vehicle seat back to be firmly and rigidly retained thereon and to be detachable therefrom; clothing suspension means carried on the mounting structure; and a plurality of longitudinally extensible leg units connected to the mounting structure at laterally spaced points and each extending from the mounting structure for a sufficient distance to reach the front edge of a conventional vehicle seat when the mounting structure is installed, whereby clothing may be suspended from the suspension means in a condition to rest on the leg units with a minimum of wrinkling.

References Cited in the file of this patent
UNITED STATES PATENTS

| | | |
|---|---|---|
| 702,914 | Boardman | June 24, 1902 |
| 829,537 | Mills | Aug. 28, 1906 |
| 1,688,225 | Belohlavek | Oct. 16, 1928 |
| 1,778,771 | Pritchard | Oct. 21, 1930 |
| 2,019,826 | McKee | Nov. 5, 1935 |
| 2,196,196 | Dorsey | Apr. 9, 1940 |
| 2,508,527 | Martin | May 23, 1950 |
| 2,582,650 | Patton | Jan. 15, 1952 |
| 2,583,860 | Batzle | Jan. 29, 1952 |
| 2,640,634 | Francis | June 2, 1953 |